United States Patent
Schank et al.

(10) Patent No.: US 9,327,831 B2
(45) Date of Patent: May 3, 2016

(54) ROTORCRAFT FLAPPING LOCK

(71) Applicant: Bell Helicopter Textron Inc., Fort Worth, TX (US)

(72) Inventors: Troy Schank, Keller, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 329 days.

(21) Appl. No.: 13/949,766

(22) Filed: Jul. 24, 2013

(65) Prior Publication Data

US 2015/0298804 A1     Oct. 22, 2015

Related U.S. Application Data

(60) Provisional application No. 61/826,158, filed on May 22, 2013, provisional application No. 61/830,402, filed on Jun. 3, 2013.

(51) Int. Cl.
| | |
|---|---|
| *B64C 27/50* | (2006.01) |
| *B64C 27/32* | (2006.01) |
| *B64C 27/30* | (2006.01) |
| *B64C 27/52* | (2006.01) |
| *B64C 27/615* | (2006.01) |
| *B64C 11/28* | (2006.01) |
| *B64C 27/605* | (2006.01) |
| *B64C 29/00* | (2006.01) |

(52) U.S. Cl.
CPC .................. *B64C 27/30* (2013.01); *B64C 11/28* (2013.01); *B64C 27/32* (2013.01); *B64C 27/50* (2013.01); *B64C 27/52* (2013.01); *B64C 27/605* (2013.01); *B64C 27/615* (2013.01); *B64C 29/0033* (2013.01)

(58) Field of Classification Search
CPC ........ B64C 27/52; B64C 11/28; B64C 27/50; B64C 2700/628; B64C 27/30
See application file for complete search history.

(56) References Cited

U.S. PATENT DOCUMENTS

| | | | |
|---|---|---|---|
| 3,087,690 A * | 4/1963 | Doman ............... | B64C 27/30 244/17.27 |
| 3,282,350 A * | 11/1966 | Kisovec .............. | B64C 27/35 416/106 |
| 3,404,852 A | 10/1968 | Sambell et al. | |
| 3,528,630 A | 9/1970 | Ferris et al. | |
| 3,625,631 A | 12/1971 | Covington et al. | |
| 3,874,817 A | 4/1975 | Ferris | |
| 4,284,387 A * | 8/1981 | Ferris ................. | B64C 27/50 416/134 A |
| 5,085,315 A | 2/1992 | Sambell | |
| 6,036,442 A | 3/2000 | Certain et al. | |
| 7,137,590 B2 | 11/2006 | Sandrart et al. | |
| 9,156,545 B1 | 10/2015 | Fenny et al. | |
| 2010/0072325 A1* | 3/2010 | Sambell .............. | B64C 11/28 244/7 A |
| 2012/0292456 A1 | 11/2012 | Hollimon et al. | |
| 2015/0274290 A1 | 10/2015 | Fenny et al. | |

* cited by examiner

*Primary Examiner* — Brian M O'Hara
(74) *Attorney, Agent, or Firm* — James E. Walton

(57) ABSTRACT

According to one embodiment, a flapping lock for a rotor system includes a downstop, a flapping stop, and an actuator. The downstop is in mechanical communication with a shaft. The flapping stop is in mechanical communication with a rotor hub. The actuator is operable to move the downstop towards the flapping stop.

8 Claims, 10 Drawing Sheets

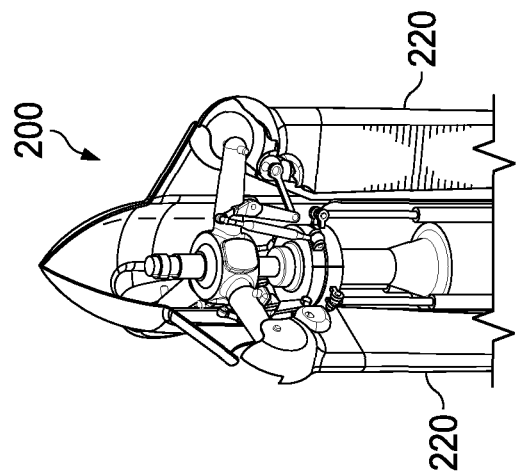
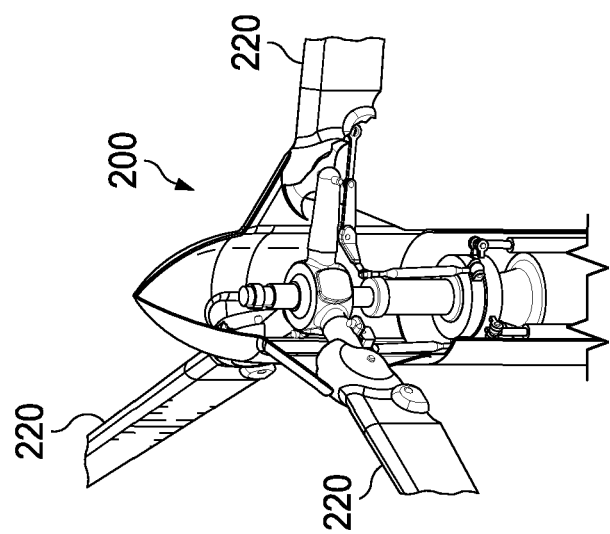
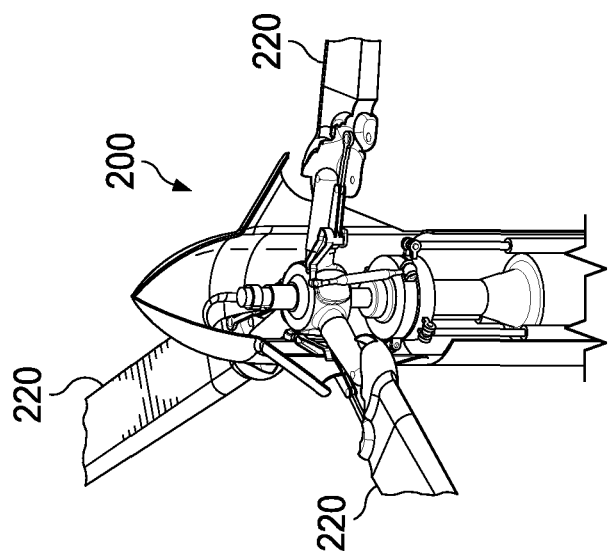

_US 9,327,831 B2_

ROTORCRAFT FLAPPING LOCK

RELATED APPLICATIONS

Pursuant to 35 U.S.C. §119 (e), this application claims priority to U.S. Provisional Patent Application Ser. No. 61/826,158, FOLDING ROTOR BLADES MECHANISM, filed May 22, 2013. U.S. Provisional Patent Application Ser. No. 61/826,158 is hereby incorporated by reference.

Pursuant to 35 U.S.C. §119 (e), this application also claims priority to U.S. Provisional Patent Application Ser. No. 61/830,402, TILT ROTOR AIRCRAFT AND TILT ROTOR STOP MECHANISM WITH VARIABLE HUB FLAPPING SPRING RATE DURING IN FLIGHT FOLDING, filed Jun. 3, 2013. U.S. Provisional Patent Application Ser. No. 61/830,402 is hereby incorporated by reference.

TECHNICAL FIELD

This invention relates generally to rotor systems, and more particularly, to a rotorcraft flapping lock.

BACKGROUND

One example of an aircraft is a tiltrotor. A tiltrotor aircraft may operate in a helicopter mode by tilting its nacelles upright and in an airplane mode by tilting its nacelles forward. Tiltrotor aircraft may generate greater forward speed in airplane mode than in helicopter mode because, in airplane mode, the rotor blades are oriented to generate greater thrust propelling the aircraft forward (somewhat analogous to a propeller).

SUMMARY

Particular embodiments of the present disclosure may provide one or more technical advantages. A technical advantage of one embodiment may include the capability of an aircraft such as a tiltrotor to generate additional forward thrust (in addition to or in place of the forward thrust generated by tiltrotor blades). A technical advantage of one embodiment may also include the capability to fold rotor blades to reduce aerodynamic forces on the blades during high-speed forward flight. A technical advantage of one embodiment may also include the capability to fold rotor blades safely and with fewer components. A technical advantage of one embodiment may also include the capability to reduce blade twist in tiltrotor blades. A technical advantage of one embodiment may also include the capability to improve aerodynamic performance of a tiltrotor blade during helicopter mode and to improve folding performance of a tiltrotor blade.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 3A, 3B, and 3C show an example transition of the rotor system of FIGS. 2A-2D from zero-feather mode (in FIG. 3A) to blade feather mode (in FIG. 3B) to blade fold mode (in FIG. 3C) according to one example embodiment.

DETAILED DESCRIPTION OF THE DRAWINGS

Figure 1A:
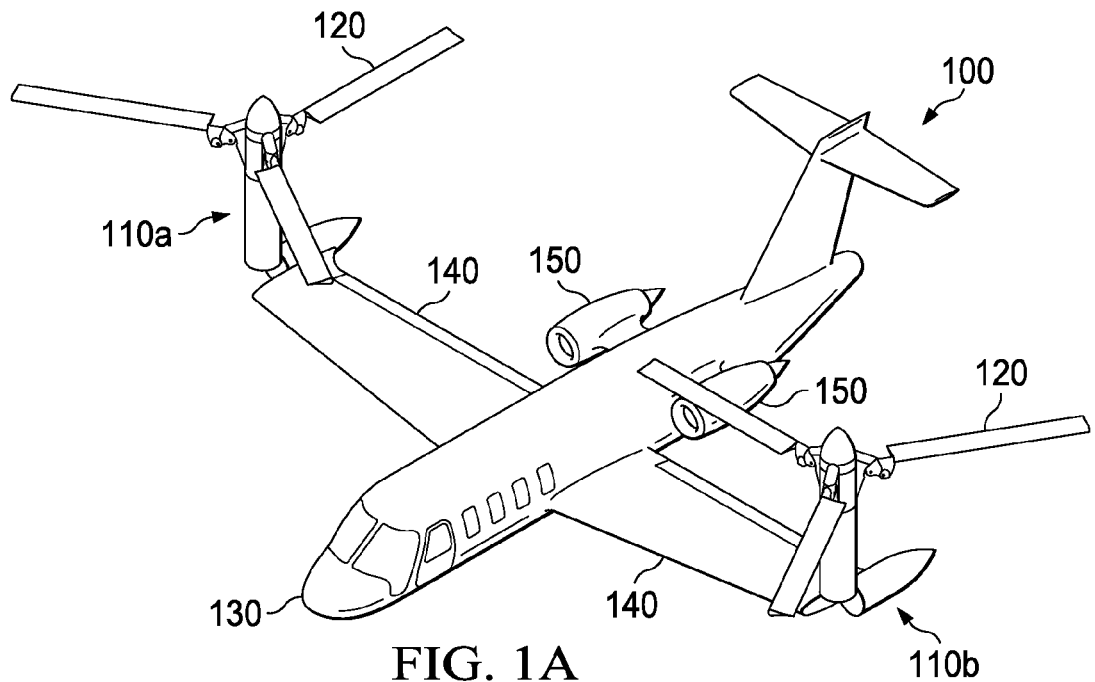
FIG. 1A shows a tiltrotor aircraft in helicopter mode according to one example embodiment.

FIG. 1A shows a rotorcraft 100 according to one example embodiment. Rotorcraft 100 features rotor systems 110a and 110b, blades 120, a fuselage 130, and a wing 140.

Rotor system 110 may rotate blades 120. Rotor system 110 may include a control system for selectively controlling the pitch of each blade 120 in order to selectively control direction, thrust, and lift of rotorcraft 100. In the example of FIG. 1A, rotorcraft 100 represents a tiltrotor aircraft, and rotor systems 110a and 110b feature rotatable nacelles. In this example, the position of nacelles, as well as the pitch of rotor blades 120, can be selectively controlled in order to selectively control direction, thrust, and lift of tiltrotor aircraft 100. Fuselage 130 represents the main body of rotorcraft 100 and may be coupled to rotor system 110 (e.g., via wing 140) such that rotor system 110 and blades 120 may move fuselage 130 through the air. Wing 140 may also generate lift during forward flight.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1A, tiltrotor aircraft 100 may operate in a helicopter mode by tilting the nacelles upright and in an airplane mode by tilting the nacelles forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Teachings of certain embodiments recognize the ability of aircraft such as rotorcraft 100 to generate additional forward thrust (in addition to or in place of the forward thrust generated by blades 120). For example, rotorcraft 100 may be equipped with jet engines 150 that provide additional forward thrust. In the example of FIG. 1A, jet engines 150 are mounted to fuselage 130 and are generally separated from rotor systems 110a and 110b. In other example embodiments, jet engines 150 may also represent the same engines that power rotor systems 110a and 110b.

Regardless of the mechanism for providing additional forward thrust, teachings of certain embodiments recognize that the existence of blades 120 may place an upper limit on the forward speed of the aircraft. For example, if the forward speed of rotorcraft 100 is too high, aerodynamic forces could damage blades 120 or even separate them from the aircraft.

Figure 1B:
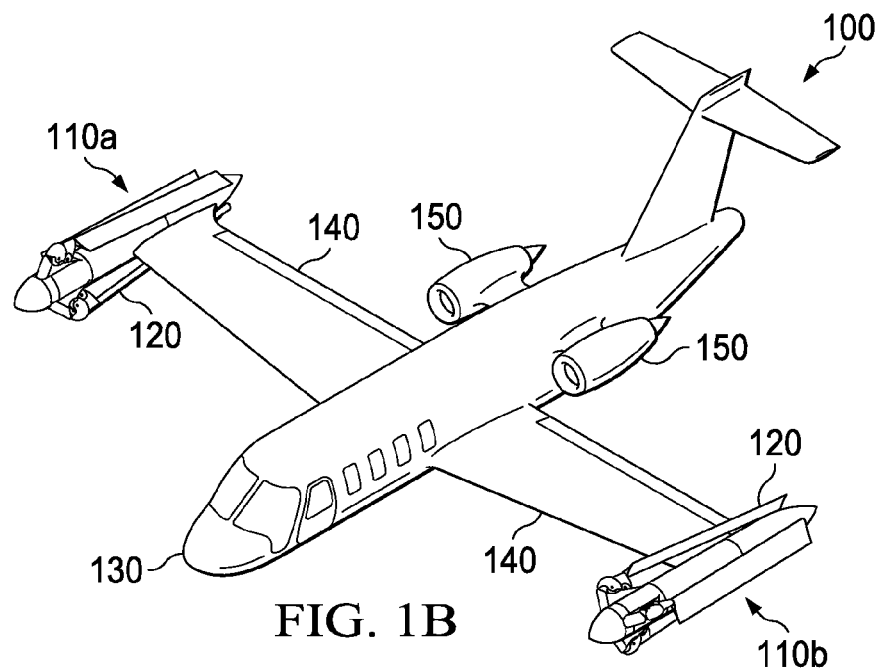
FIG. 1B shows the tiltrotor aircraft of FIG. 1A in high-speed forward flight mode according to one example embodiment.

Accordingly, teachings of certain embodiments recognize the capability to fold rotor blades to reduce aerodynamic forces on the blades during high-speed forward flight. FIG. 1B shows rotorcraft 100 with blades 120 folded. In the example of FIG. 1B, jet engines 150 may provide thrust during forward flight, and wing 140 may generate lift. In this example, blades 120 in the folded position as shown in FIG.

1B may result in less drag than when blades 120 are in the extended position as shown in FIG. 1.

Teachings of certain embodiments also recognize that the ability to safely and efficiently fold blades and therefore increase the forward-speed of the aircraft may allow blades to be somewhat flatter (have less blade twist) than, for example, typical tiltrotor blades. For example, conventional tiltrotor blades may operate in two modes: helicopter mode and airplane mode. Some tiltrotor blades 120 may include additional twist to improve performance during airplane mode. Folding blades, however, may not spend much time in airplane mode, and therefore, performance in airplane mode may not be a primary concern. For example, in some embodiments, airplane mode may represent a relatively-short transition period between helicopter mode and high-speed forward flight (e.g., jet mode) when blades 220 are folded. In this example, folding blades 220 may be designed primarily for helicopter mode, which may allow for somewhat flatter blade designs.

In addition, teachings of certain embodiments recognize that reducing twist in tiltrotor blades may improve folding performance of blades 220. For example, as will be explained in greater detail below, teachings of certain embodiments recognize that driving all blade leading edges "edge-on" into the freestream may reduce aerodynamic loads on the blades during blade folding. A highly-twisted blade, however, may not be able to become fully edge-on because, even if a portion of the blade leading edges are driven into the freestream, the blade twist causes at least part of each blade to be "end flat" relative to the freestream. A blade surface that is "end flat" may have higher aerodynamic loads than a blade surface that is edge-on. Unlike a highly-twisted blade, a blade with less twist may be able to drive a greater percentage of the blade leading edges into the freestream while having a lower percentage of the blade surfaces "end flat" relative to the free stream. Accordingly, teachings of certain embodiments recognize that reducing twist in blades 220 may improve folding performance by reducing aerodynamic loads on blades 220 during the folding process.

Furthermore, teachings of certain embodiments recognize the capability to fold rotor blades safely and with fewer components. As will be explained in greater detail below, teachings of certain embodiments recognize the capability to fold all rotor blades in a rotor system collectively without providing an actuator for each rotor blade. Teachings of certain embodiments also recognize the ability to satisfy reliability requirements and avoid jam-type faults of geared actuators.

For example, as will be explained in greater detail below, teachings of certain embodiments recognize the capability to prevent failures in which some rotor blades are folded and others are not and to prevent failures in which the rotor blades are only partially deployed (e.g., between folded and extended states). By preventing such failures, rotorcraft 100 may be able to land safely even if the folding mechanism malfunctions. For example, if the folding mechanism malfunctions while the rotor blades are folded, rotorcraft 100 may land on a runway like an aircraft. If, on the other hand, the folding mechanism malfunctions while the blades are extended, rotorcraft 100 may land on a landing pad in helicopter mode.

FIGS. 2A-2H show perspective views of a rotor system 200 according to one example embodiment. The example rotor system 200 may be equipped on a rotorcraft such as the example tiltrotor aircraft 100 of FIGS. 1A and 1B.

Figure 2A:
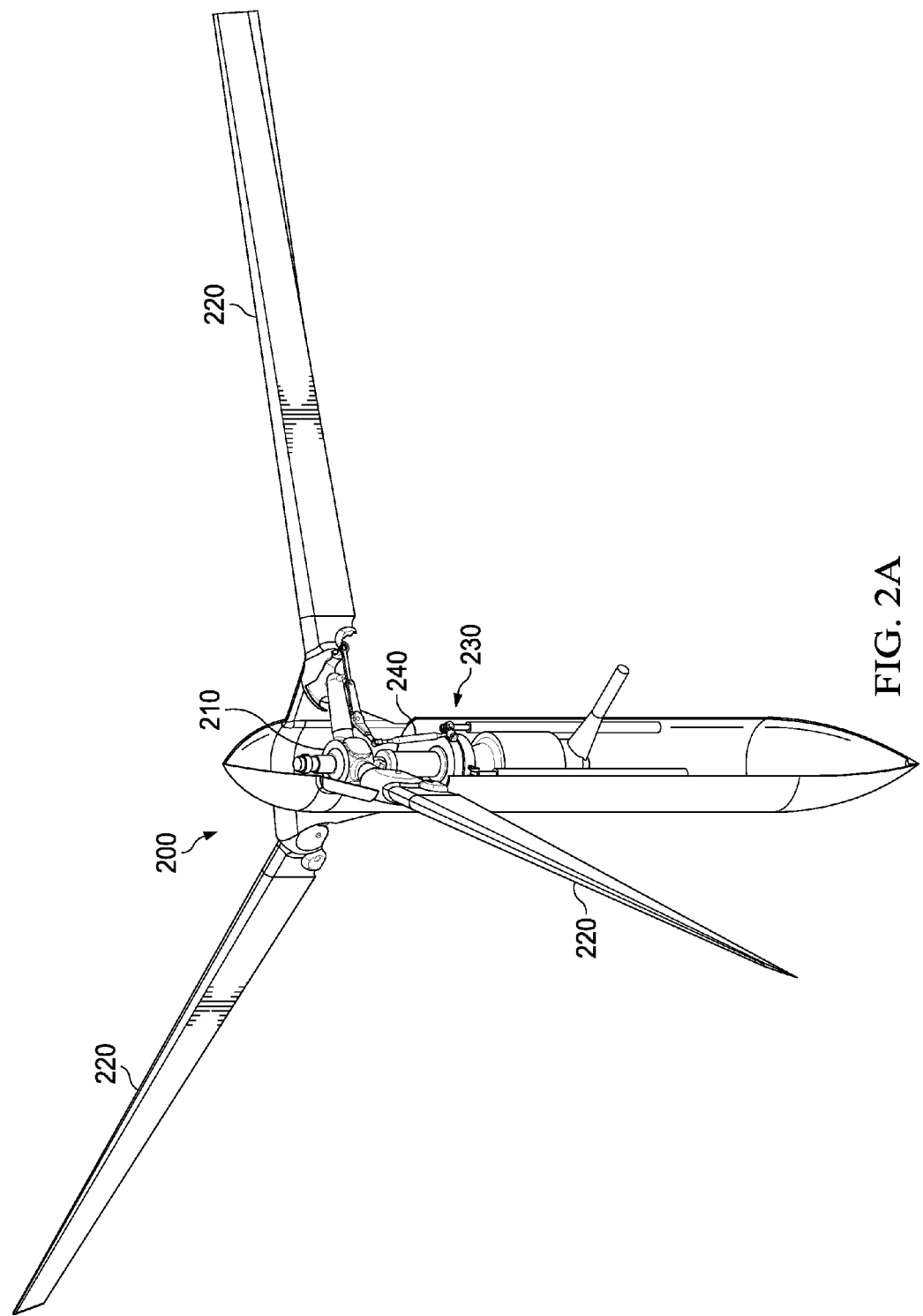
FIGS. 2A-2H show perspective views of a rotor system that may be equipped on a rotorcraft such as the example tiltrotor aircraft of FIGS. 1A and 1B.
Figure 2B:
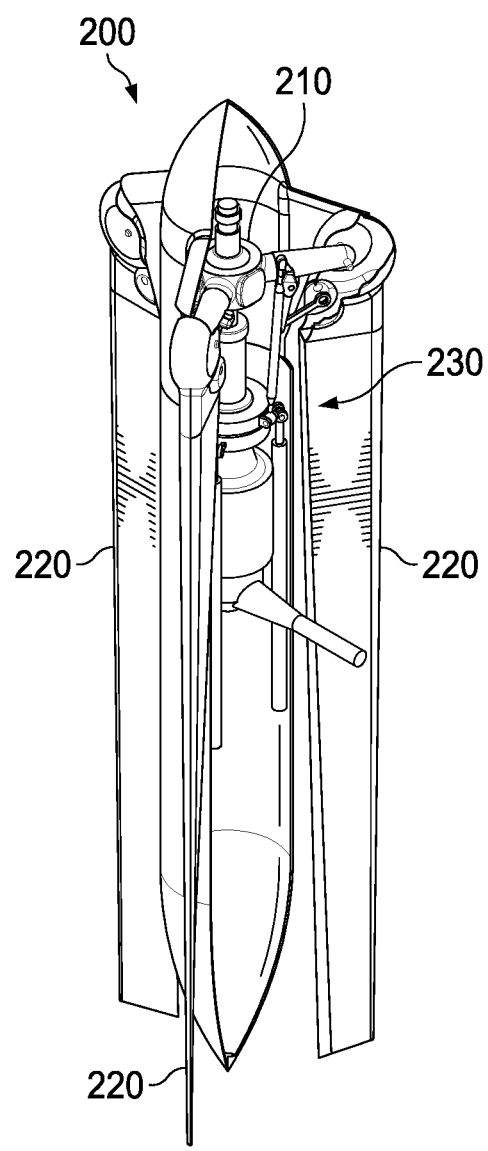
Figure 2C:
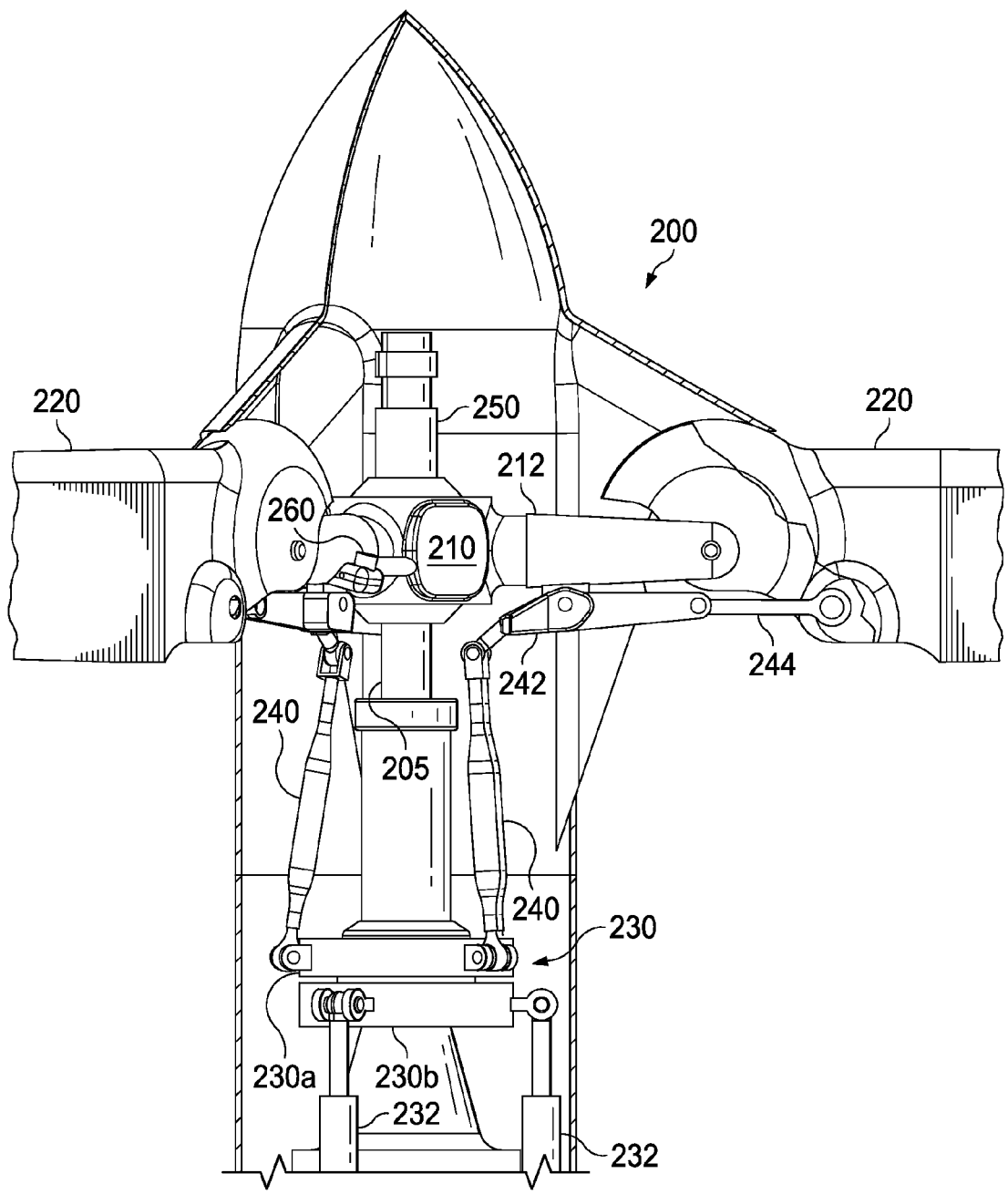
Figure 2D:
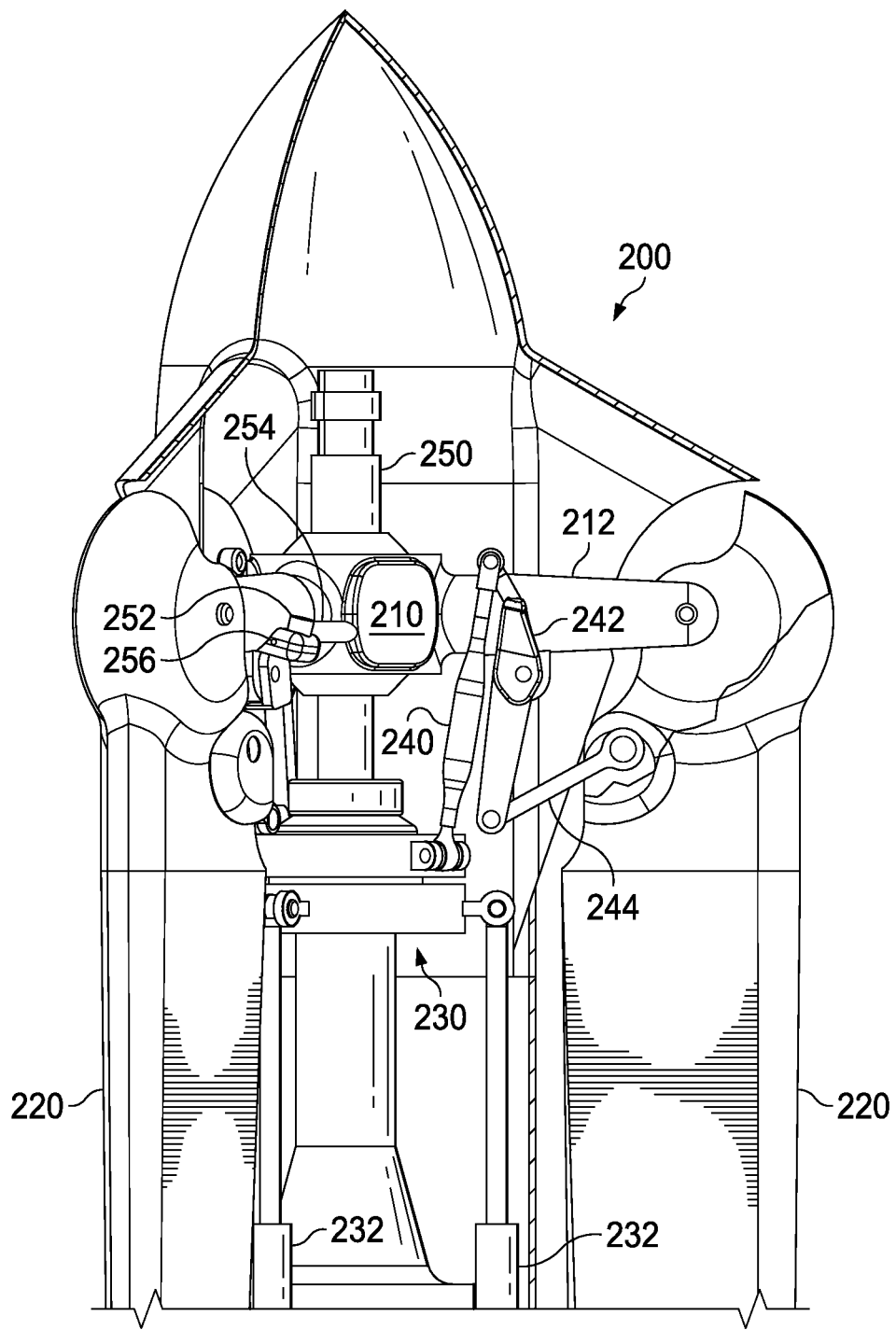

FIGS. 2A and 2B show larger perspective views of rotor system 200 with blades 220, and FIGS. 2C-2H show perspective views of various components of rotor system 200. In the example of FIGS. 2A and 2C, blades 220 are extended outwards (i.e., blades 220 are in a deployed state). Blades 220 may be in a deployed state, for example, during helicopter mode and airplane mode. In the example of FIGS. 2B and 2D, on the other hand, blades 220 are folded inwards. Blades 220 may be folded inwards, for example, during high-speed forward flight.

In the example of FIGS. 2A-2D, rotor system 200 features a shaft 205, a hub 210, a grip 212, blades 220, a swashplate 230, swashplate actuators 232, links 240, pitch horn/fold cranks 242, and fold links 244. In some examples, rotor system 200 may include more or fewer components.

Shaft 205 may represent one or more components of a power train, which may also include other components such as a power source. The power source, shaft 205, and hub 210 are mechanical components for transmitting torque and/or rotation. The power train may include a variety of components, including an engine, a transmission, and differentials. In operation, the drive shaft receives torque or rotational energy from the power source and rotates hub 210. Rotation of rotor hub 210 causes blades 220 to rotate about the drive shaft.

Swashplate 230 translates rotorcraft flight control input into motion of blades 220. Because blades 220 are typically spinning when the rotorcraft is in flight (e.g., in helicopter mode), swashplate 230 may transmit flight control input from the non-rotating fuselage to the hub 210, blades 220, and/or components coupling hub 210 to blades 220 (e.g., grip 212).

In some examples, swashplate 230 may include a non-rotating swashplate ring 230a and a rotating swashplate ring 230b. Non-rotating swashplate ring 230a does not rotate with drive shaft 205, whereas rotating swashplate ring 230b does rotate with drive shaft 205.

In some embodiments, operation of rotor system 200 may be organized into five operation phases: helicopter mode, conversion mode, tiltrotor airplane mode, folding mode (may also be referred to as transition mode), and high-speed forward flight mode. In helicopter mode, for example, the nacelles are tilted upright to generate greater lift. In this example, translating the non-rotating swashplate ring 230a along the axis of the drive shaft causes the links 240 to move up or down. This changes the pitch angle of all blades 220 equally, increasing or decreasing the thrust of the rotor and causing the aircraft to ascend or descend. Tilting the non-rotating swashplate ring 230a causes the rotating swashplate ring 230b to tilt, moving the links 240 up and down cyclically as they rotate with the drive shaft. This tilts the thrust vector of the rotor, causing rotorcraft 100 to translate horizontally.

In conversion mode, rotor system 200 may convert from helicopter mode to tiltrotor airplane mode. For example, in some embodiments, rotor system 200 may convert from helicopter mode to tiltrotor airplane mode by tilting the nacelles from an upright position to a forward position, which may result in blades 220 generating greater forward thrust.

In folding mode, rotor system 200 may also convert from tiltrotor airplane mode to high-speed forward flight mode by folding rotor blades 220 back. In one example embodiment, propulsion may be transferred from the proprotors to thrusting engines (e.g., jet engines 150) at a specified speed. Next, rotorcraft 100 may stop and lock rotor systems 200 such that blades 220 cease spinning. For example, rotor collective may be adjusted to reduce torque and rotor speed is reduced (e.g., to approximately 70% RPM). A flapping lock 250 may be engaged to prevent large flap displacements with reduced CF. After engaging flapping lock 250, collective pitch may be increased (e.g., to about 90°) so as to stop rotor motion. The rotor may then be precessed to a specified azimuth angle and then locked.

Figure 2E:
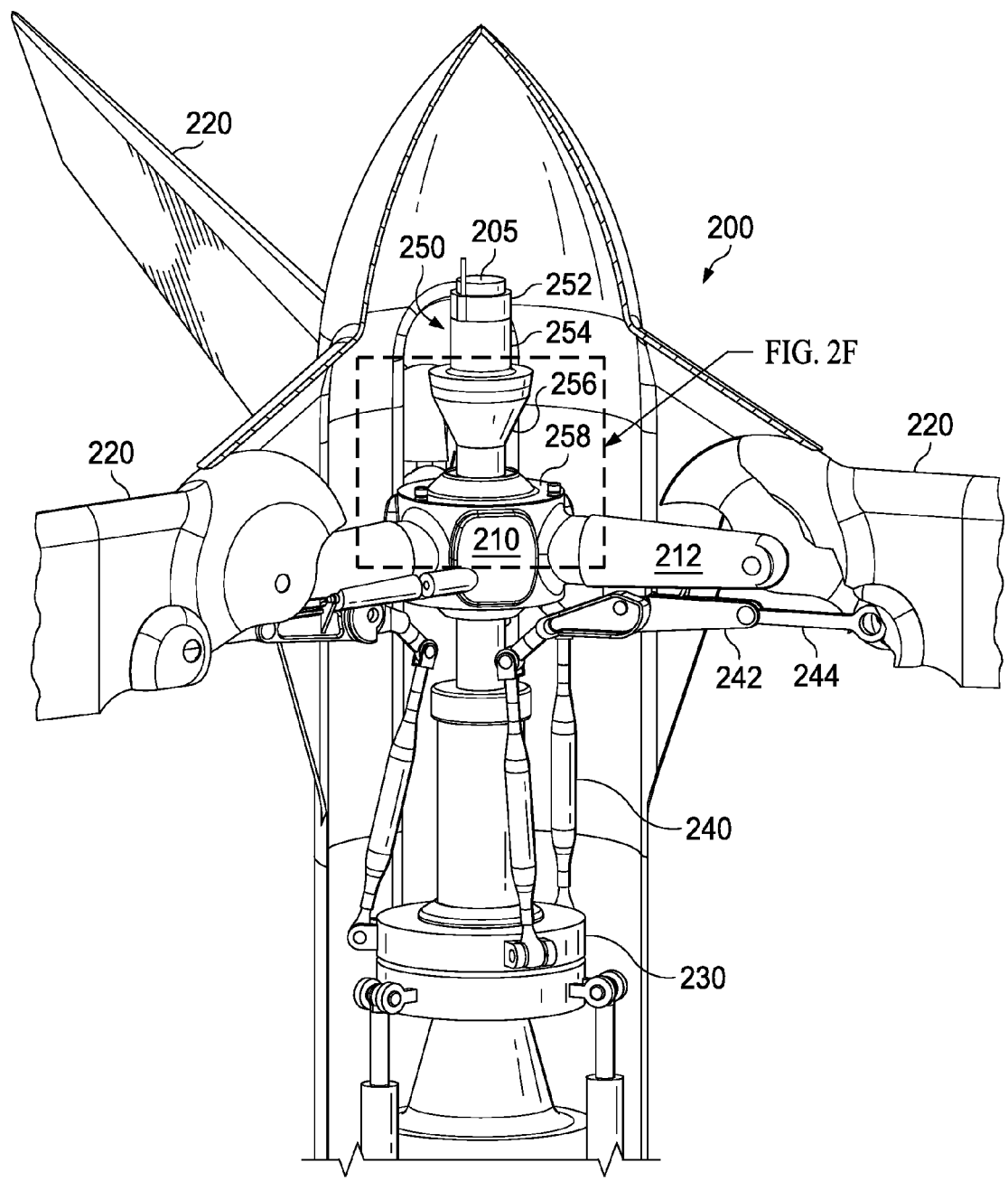
Figure 2F:
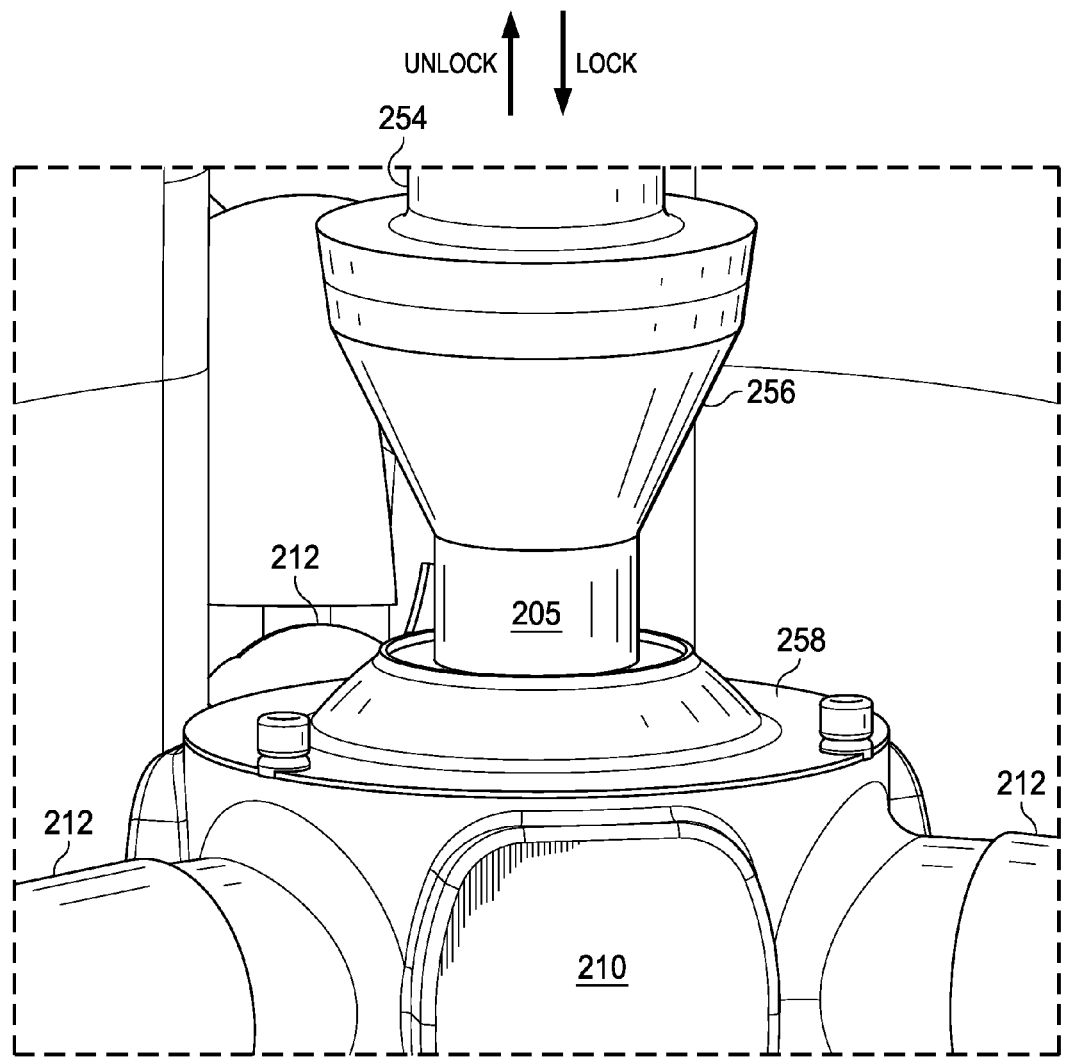

FIGS. 2E and 2F show perspective views of flapping lock 250 according to one example embodiment. In the example of FIGS. 2E and 2F, flapping lock 250 features an actuator 252, a downstop 254, load absorber 256, and a flapping stop 258. In operation, according to one example embodiment, flapping lock 250 may prevent large flapping displacements by pushing downstop 254 towards flapping stop 258, which restricts flapping movement of hub 210).

In some embodiments, flapping lock 250 may be deployed in a locked position, an unlocked position, or a partially-locked position (e.g., between the locked and unlocked position). In the locked position, flapping lock 250 may prevent at least some flapping of hub 210 relative to shaft 205 (e.g., preventing large flapping displacements by pushing downstop 254 towards flapping stop 258, which restricts flapping movement of hub 210). In the unlocked position, on the other hand, such flapping movement may be allowed. In a partially-locked position, load absorber 256 may be in contact with flapping stop 258 to resist some flapping movements.

In the example of FIGS. 2E and 2F, shaft 205 and hub 210 may move relative to one another when flapping lock 250 is in an unlocked position. In one example embodiment, shaft 205 may move conically relative to a pivot point, and hub 210 may move spherically about a spherical element. Moving flapping lock 250 to a locked position by pushing downstop 254 towards flapping stop 258 may prevent downstop 254 and hub 210 from moving relative to one another.

Teachings of certain embodiments recognize that load absorber 256 may minimize loads and maximize rotor system stability. For example, without load absorber 256, flapping lock 250 would prevent flapping by locking rigid downstop 254 against rigid flapping stop 258. This rigid locking mechanism, however, would result in a load spike on the rotor system and drive train when the rigid downstop 254 contacts rigid flapping stop 258. A large load spike, however, could cause substantial damage to the rotor system as well as other parts of the aircraft.

Providing load absorber 256 between downstop 254 and flapping stop 258 may help prevent load spikes by reducing rotor flapping more gradually over time as downstop 254 moves closer to flapping stop 258. In this example, allowable rotor flapping may be reduced as downstop 254 moves closer to flapping stop 258 until downstop 254 moves close enough to flapping stop 258 to eliminate most, if not all, rotor flapping.

In addition, reducing rotor flapping gradually may allow flapping lock 250 to prevent rotor system 200 from exceeding its maximum allowable flapping threshold during locking. For example, rotor system 200 may have a maximum allowable flapping threshold that changes as a function of rotor rotation speed and collective angle during the in-flight folding process. Load absorber 256 may provide a spring rate profile that allows flapping lock 250 to reduce flapping at a rate that corresponds to how the maximum allowable flapping threshold changes during folding or at least maintain rotor flapping at a value under the maximum allowable flapping threshold function.

Load absorber 256 may be made from any suitable material. In some embodiments, load absorber 256 is formed from an elastomeric material. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression.

Once the flapping lock is engaged, the rotor may be rotated and locked at a specified azimuth angle, and blades 220 may be folded. In the example of FIGS. 2C-2F, rotor system 200 features several components that may aid in folding blades 220, including links 240, pitch horn/fold cranks 242, and fold links 244. The pitch horn may double as the fold crank depending on which mode of operation the rotor is in.

Figure 2G:
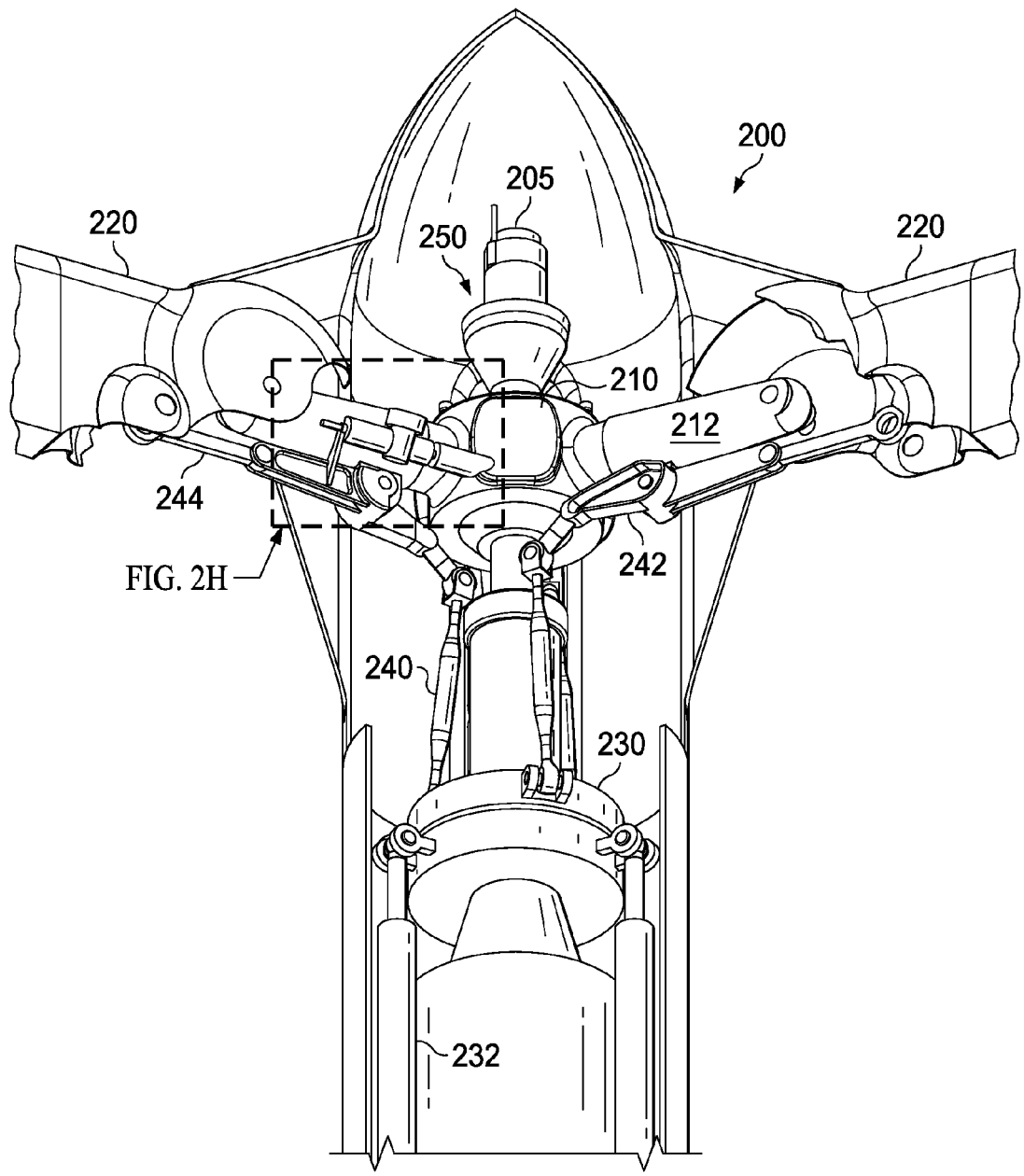
Figure 2H:
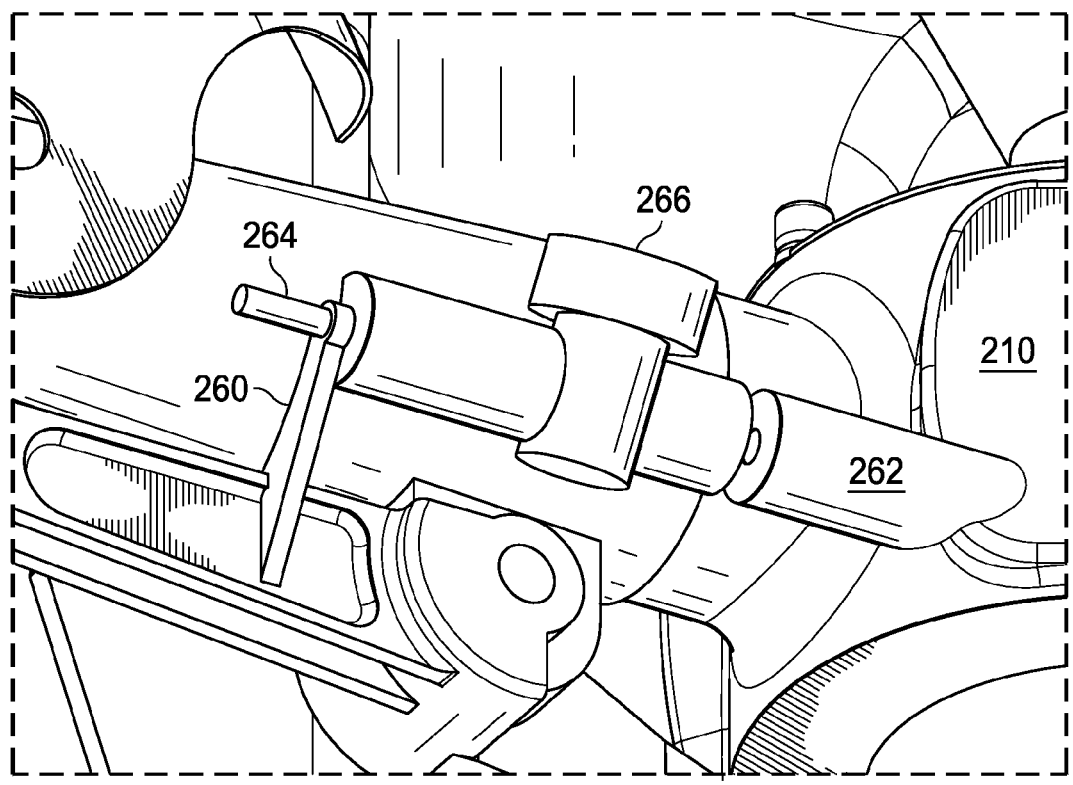

In the example of FIGS. 2G-2H, the mode of operation may be determined by a translating lock pin 264 on the blade grip, which depending on its position, locks out feather or fold motions. In the example of FIG. 2H, a pin actuator 266 may move translating lock pin 264 between a feather mode and a fold mode. In one example embodiment, pin actuator 266 is a geared rotary actuator that drives translating lock pin 264 through a pinion gear.

In feather mode, the translating lock pin 264 is at an outward position to lock the fold crank in place (e.g., using fold lock 260) and free pitch displacements. In this mode, the input lever functions as a conventional pitch horn causing the cuff and blade to feather with cyclic and collective inputs from the swashplate. In fold mode, the pin 264 is at an inward position to lock the pitch displacement out (e.g., using feather lock 262) and allow blade fold. In this mode, the input lever effectively becomes a fold crank, driving the fold link and blade to fold along the nacelle with collective inputs.

Accordingly, to fold blades 220, translating lock pin 264 may be repositioned so as to disengage fold lock 260 and engage feather lock 262. Teachings of certain embodiments recognize that coupling engagement of fold lock 260 and feather lock 262 may prevent failures in which blades 220 are between modes of operation. For example, teachings of certain embodiments recognize that devices such as translating lock pin 264 may cause rotor system 200 to fail in either feather mode or fold mode, but not between feather mode and fold mode.

After disengaging fold lock 260 and engaging feather lock 262, blades may be folded back to a low drag configuration by actuating the swashplate collective position using swashplate actuators 232. Actuating the swashplate collective position may cause links 240 to rotate fold crank 242 about a fixed point, which may cause fold crank 242 to reposition fold link 244, which folds blades 220. To deploy the rotor from its folded state, the process may be conducted in reverse.

FIGS. 3A, 3B, and 3C show an example transition from zero-feather mode (in FIG. 3A) to blade feather mode (in FIG. 3B) to blade fold mode (in FIG. 3C) according to one example embodiment. When the rotor transitions from the deployed state to the folded state, swashplate 230 initially lowers (away from hub 210), driving all blade leading edges into the freestream (in an "edge-on" state). Teachings of certain embodiments recognize that driving all blade leading edges into the freestream may reduce aerodynamic loads on the blades.

At full collective, the effective aerodynamic torque may be zeroed on the rotor. At this position, the lock pin 264 on the cuff is aligned with the corresponding hole on grip 212 and is driven inward, locking pitch displacements, and simultaneously unlocking fold displacements. Swashplate 230 then moves up (toward hub 210) collectively and drives fold crank 242 and fold link 244, which in turn folds blades 220 edgewise along the nacelle. In the folded condition, links 240, fold crank 242 and fold links 244 may be compactly tucked within the nacelle for a clean, low drag configuration. To deploy the rotor from its folded state, the process may be reversed.

Blade fold angles may be monitored during the fold/deployment process. During blade fold, cyclic control inputs may be zeroed with only collective input such that all blade fold angles of a given rotor will be equal. In the fold process, blade angles between two rotor systems (e.g., rotor systems 110a and 110b) will be monitored and controlled to follow each other. Position feedback from the swashplate actuators 232, fold crank 242 and translating lock pin 264 may be used to determine control synchronization. In some embodiments, a failure of any component to follow an expected displacement command will immediately indicate a fault with mitigating action. In some embodiments, swashplate actuators 232 may have triplex redundancy built in and can remain functional with single and dual strand faults.

In the case that a lock failure occurs, such as a jam, the rotor would be 'stuck' in either the deployed state or folded state. In some embodiments, multiple pins 264 may be mechanically coupled together such that all locking mechanisms in a rotor system may succeed or fail together. Teachings of certain embodiments recognize that this bi-modal failure potential may allow the aircraft to land, depending on the failure state, in either helicopter mode or in airplane mode without harm to pilot and aircraft.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
a body;
a wing coupled to the body;
a power train coupled to at least one of the body or the wing and comprising a power source and a shaft in mechanical communication with the power source;
a tiltrotor assembly pivotally coupled to the wing and in mechanical communication with the shaft, the tiltrotor assembly comprising:
a hub in mechanical communication with the shaft;
a rotor blade in mechanical communication with the hub;
a flapping lock deployable in a locked position in an unlocked position, the flapping lock operable in the locked position to prevent at least some flapping movement of the hub relative to the shaft, the flapping lock operable in the unlocked position to allow the at least some flapping movement of the hub relative to the shaft; and
the flapping lock comprising an actuator, a downstop in mechanical communication with the shaft, and a flapping stop in mechanical communication with the hub.

2. The rotorcraft of claim 1, the actuator operable to deploy the flapping lock in the locked position by moving the downstop towards the flapping stop.

3. The rotorcraft of claim 1, the flapping lock further comprising a load absorber positioned between the downstop and the flapping stop.

4. The rotorcraft of claim 3, wherein the load absorber is comprised of an elastomeric material.

5. The rotorcraft of claim 3, wherein the load absorber is coupled to the downstop.

6. The rotorcraft of claim 5, the flapping lock further comprising a second load absorber coupled to the flapping stop.

7. The rotorcraft of claim 1, wherein the flapping lock in the locked position substantially maintains the hub perpendicular to the shaft.

8. The rotorcraft of claim 1, wherein the flapping lock in the unlocked position allows the shaft to move conically relative to a pivot point and the hub to move spherically about a spherical element.

* * * * *